US011651057B2

(12) United States Patent
Rose et al.

(10) Patent No.: US 11,651,057 B2
(45) Date of Patent: *May 16, 2023

(54) MODIFYING APPLICATION FUNCTION BASED ON LOGIN ATTEMPT CONFIDENCE SCORE

(71) Applicant: Truist Bank, Charlotte, NC (US)

(72) Inventors: Amy Rose, Chapel Hill, NC (US); Joseph Aguayo, Fuquay Varina, NC (US); David Stone, Wake Forest, NC (US)

(73) Assignee: Truist Bank, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/826,810

(22) Filed: May 27, 2022

(65) Prior Publication Data
US 2022/0300588 A1 Sep. 22, 2022

Related U.S. Application Data

(63) Continuation of application No. 16/353,419, filed on Mar. 14, 2019, now Pat. No. 11,392,677.

(51) Int. Cl.
H04L 9/40 (2022.01)
G06F 21/31 (2013.01)

(52) U.S. Cl.
CPC ........ G06F 21/316 (2013.01); H04L 63/0876 (2013.01); H04L 63/1483 (2013.01); H04L 63/20 (2013.01)

(58) Field of Classification Search
CPC . G06F 21/316; G06F 21/629; H04L 63/0876; H04L 63/1483; H04L 63/20; H04L 63/105; H04L 63/107; H04L 63/1425
See application file for complete search history.

(56) References Cited

U.S. PATENT DOCUMENTS

| 9,349,014 | B1* | 5/2016 | Hubing | G06F 21/316 |
| 2016/0163320 | A1 | 6/2016 | Scheffer et al. | |
| 2018/0046796 | A1* | 2/2018 | Wright | G06F 21/45 |
| 2019/0019363 | A1* | 1/2019 | Zellner | H04L 63/1416 |
| 2019/0220583 | A1 | 7/2019 | Douglas et al. | |

(Continued)

OTHER PUBLICATIONS

U.S. Appl. No. 16/353,419, "Advisory Action", dated Sep. 30, 2021, 2 pages.

(Continued)

Primary Examiner — Nelson S. Giddins
(74) Attorney, Agent, or Firm — Kilpatrick Townsend & Stockton LLP; Michael A. Springs, Esq.

(57) ABSTRACT

Account permissions and data accessibility can be modified based on level of confidence for a login attempt to the account. User activity observations corresponding to one or more login attempts to access a user account can be stored. A confidence score associated with a successful login attempt of the user account can be determined. The confidence score is based on the user activity observations. A level of access to an application with functions and data for the user account can be determined. The level of access is based on the confidence score. The level of access is associated with the functions and the data that are executable and accessible subsequent to the successful login attempt.

20 Claims, 4 Drawing Sheets

(56) References Cited

U.S. PATENT DOCUMENTS

2020/0026830 A1  1/2020  Alameh et al.
2020/0110870 A1  4/2020  Girdhar et al.

OTHER PUBLICATIONS

U.S. Appl. No. 16/353,419, "Final Office Action", dated Jun. 23, 2021, 12 pages.
U.S. Appl. No. 16/353,419, "Non-Final Office Action", dated Dec. 23, 2020, 11 pages.
U.S. Appl. No. 16/353,419, "Non-Final Office Action", dated Nov. 18, 2021, 12 pages.
U.S. Appl. No. 16/353,419, "Notice of Allowance", dated Mar. 21, 2022, 7 pages.

* cited by examiner

MODIFYING APPLICATION FUNCTION BASED ON LOGIN ATTEMPT CONFIDENCE SCORE

CROSS-REFERENCE TO RELATED APPLICATIONS

The present application is a continuation of U.S. application Ser. No. 16/353,419, filed on Mar. 14, 2019, entitled "MODIFYING APPLICATION FUNCTION BASED ON LOGIN ATTEMPT CONFIDENCE SCORE," the entirety of which is incorporated by reference herein.

TECHNICAL FIELD

The present disclosure relates to network communications. More specifically, but not by way of limitation, this disclosure relates to modifying functions that are remotely controllable by assessing a login attempt to access the functions.

BACKGROUND

Applications currently give permissions in an all-or-nothing manner after a successful login to a user account has been performed using valid account credentials. Once a password is determined and used in a successful login attempt of a user account, all available functions and personal data are available to the user, regardless of any suspicious or anomalous behavior that may indicate a malicious attack. This can allow attackers to gain full account permissions if the attackers log into an application after performing known hacking methodologies. On the other end of the spectrum, legitimate users may be prevented from accessing account data and performing any functions upon an inadvertent action that mimics a malice attack.

SUMMARY

In one example, a server device includes a processor device and a non-transitory computer readable medium. The non-transitory computer-readable medium includes a data store and a control access module. The data store is configured to store user activity observations that are recorded during one or more login attempts to access a user account. The control access module is executable by the processor device to determine a confidence score associated with a current login attempt of the user account and to use the confidence score to determine a level of access subsequent to the current login attempt to an application with functions and data for the user account. The confidence score is based on the user activity observations and the level of access is associated with the functions and the data that are executable and accessible subsequent to the current login attempt being successful.

In another example, a non-transitory computer-readable medium having program code stored thereon that is executable by a processor device to perform actions. The actions include storing user activity observations corresponding to one or more login attempts to access a user account. The actions also include determining a confidence score associated with a current login attempt of the user account, wherein the confidence score is based on the user activity observations. The actions also include determining a level of access to an application with functions and data for the user account, wherein the level of access is based on the confidence score, and wherein the level of access is associated with the functions and the data that are executable and accessible subsequent to the current login attempt being successful.

In a further example, a method includes storing, in a data store of a non-transitory computer-readable medium, user activity observations corresponding to one or more login attempts to access a user account. The method also includes determining, by a processor device, a confidence score associated with a successful login attempt of the user account, wherein the confidence score is based on the user activity observations. The method also includes determining, by the processor device during the successful login attempt, a level of access to an application with functions and data for the user account, wherein the level of access is based on the confidence score. The level of access is associated with the functions and the data that are executable and accessible subsequent to the successful login attempt.

DETAILED DESCRIPTION

Figure 1:
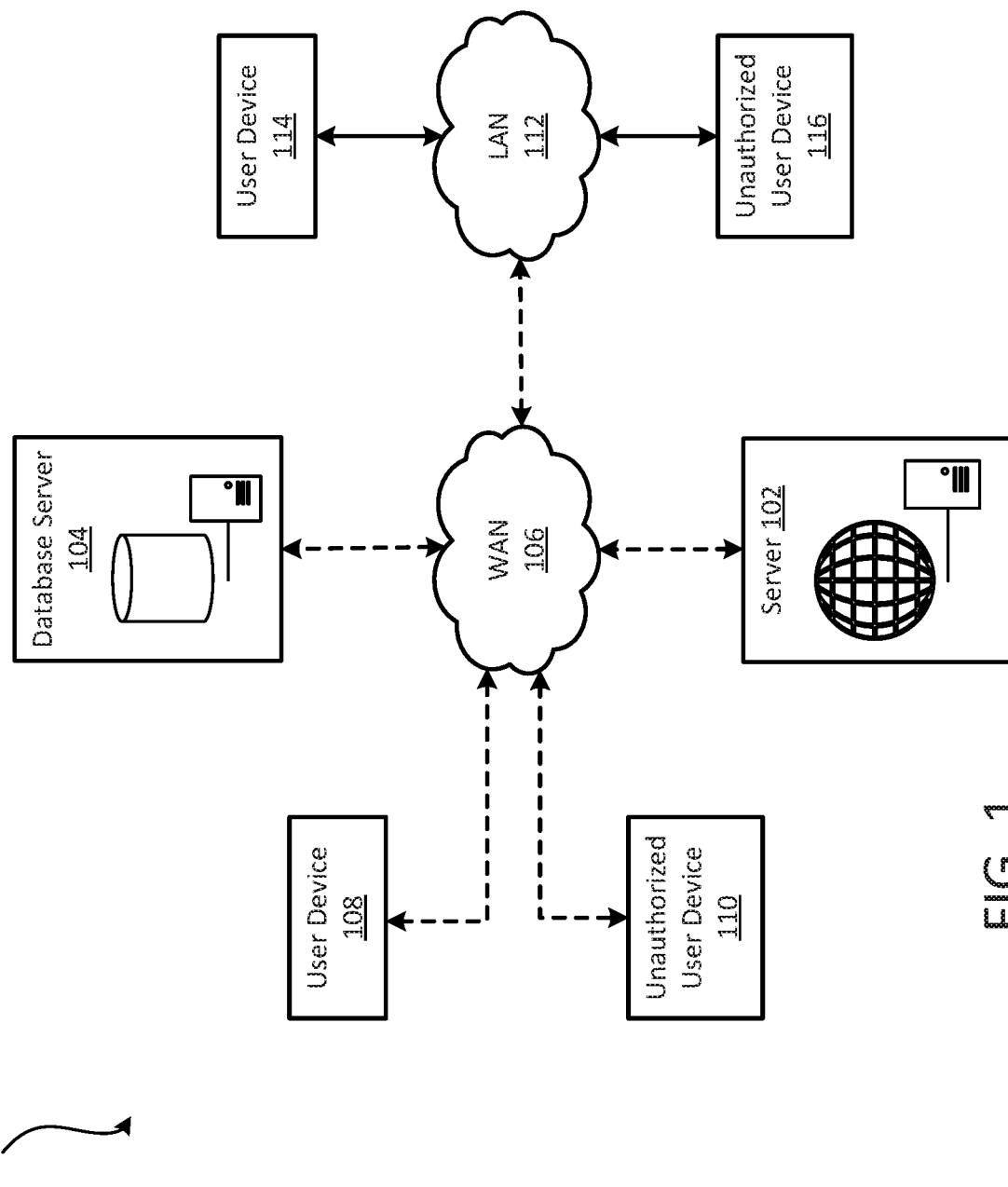
FIG. 1 is a schematic of an example of a network environment used to modify application function accessibility based on a confidence score for a user login according to one aspect of the disclosure.

Certain aspects and features relate to modifying computer-network account permissions based on a confidence score for a user login. Attributes of a login or a login attempt can be analyzed and compared to dynamic scoring rules to output a score that is representative of confidence that the login is by a user authorized to perform functions on a computer application. The score can be used in a dynamic permission ruleset to control the account data and the functions that are accessible to the user in a network communication session established using the login. By using dynamic rules, a legitimate user can access account information and cause certain functions to be performed even if the legitimate user's login attempt is not determined to be completely safe login, but also protecting sensitive functions and data from accessibility in case the login is by an unauthorized user. For example, the user may be traveling in a foreign country in which the user has not previously attempted to communicate with the network. The user may be able to access certain information and cause the remote application to perform certain functions, but not be able to access all information or cause the remote application to perform all functions.

Device information and user behaviors can be recorded during failed and successful login attempts. The recorded device information and user behaviors can be used to determine a confidence score. The confidence score can represent a likelihood that the user is an authorized user of the account or an unauthorized user, such as a hacker. Based on the confidence score, certain levels of access to the application can be determined to allow the user to have access to certain features and data.

A user may be an unauthorized user, such as a hacker, or an authorized user, such as an owner of an account or a user who has been granted permission by the account owner to access the account. An unauthorized user is a user attempting to log into an account to which permission was not granted by an authorized user.

An application can be a mobile application, such as an application that can be downloaded on a mobile user device, where the processes of the application can be performed locally on the mobile device. In some examples, an application can be provided to a user via a website, such that the application can be a network application operated remotely on a server.

User activity observations, which can include user behaviors and user device information, can be recorded during login attempts. User behavior and user device information that is recorded during unsuccessful and successful login attempts to access a user account can be used to identify possible malicious attacks and increase account security. The user behavior and device information can be used to determine a confidence score. A confidence score can be used to grant a user certain account permissions and access to data after a successful login attempt. The recorded user behavior and user device information can be used to determine a baseline profile or normal activity corresponding to the authorized user or users of an account. A recognizable pattern of user activity and device information corresponding to devices used to access an account can be determined over time by analyzing multiple successful login attempts. The determined user behavior and device patterns can be stored, in association with the account and account credentials, in a database as a user profile to compare against subsequently recorded user behaviors and device information during additional login attempts.

For example, a user may often log into a bank account through an application on a mobile device while travelling, but may prefer to use a desktop computer to access the same account through a web application when at home. A user profile corresponding to the bank account can be used to determine whether any behavior or device information used for further login attempts is normal or abnormal. For example, the user may attempt to login to the account using a mobile device while on vacation, which may be determined to be normal behavior within the scope of the recognized user behavior patterns. As another example, the same user may attempt to login to the account using a different desktop computer while not at home or connected to a home network. This behavior may be flagged as suspicious, or anomalous, and the behavior may indicate the possibility of a malicious attack.

Anomalous user behavior that can be recorded during login attempts can include a different or unexpected location, attempting to enter account credentials in too fast, attempting to enter account credentials too many times within a certain period, entering account credentials in specific patterns, or any other user behavior that may be attributed to known hacking methodologies. For example, a malicious attack may be initiated by a bot in the form of a dictionary attack, which may be attempting to login using randomly or sequentially generated passwords that are being entered at a rate faster than the rate possible by manual human operation. The type of attack and speed of account credentials being entered can indicate abnormal behavior indicative of a malicious attack, since an authorized user, as determined by the corresponding user profile, would not enter so many different passwords at such high speeds.

Device information that can be recorded during login attempts can include hardware information such as device identification (e.g., MAC address), browser settings, and hardware specifications and model. Device information can also be associated with network information used by the user device to access an application. Information including IP addresses, and device location as determined via geolocation through Bluetooth or satellite connections, may be obtained and attributed to a specific user and user account. For example, anomalous device information indicating a malicious attack may include a user attempting to log into an electronic trading account on a newly purchased mobile device, such that all previous login attempts were made using an older mobile device or desktop computer.

The user activity observations can be used to determine a confidence score, which can represent the likelihood that a user accessing an account after a successful login attempt is actually an authorized user. A high confidence score can indicate that a user who initiated a successful login attempt is an authorized user of that account. A low confidence score can indicate that a user who initiated a successful login attempt is not an authorized user of that account, and instead may be an automated program or a hacker initiating a malicious attack. An increased rate of anomalous user activity observations, including abnormal behaviors or unknown device information, can lower the confidence score generated upon a successful login.

A confidence score may be indicative of a number of types of login attempts, including hacking attempts, valid login attempts by an authorized user, or attempts by an authorized user in an unsecure environment. Determining the type of login attempt can be used to determine what, if any, account access restrictions should be temporarily implemented as a safeguard against theft. A high confidence score can correspond to a valid login attempt by an authorized user. A low or lower confidence score can correspond to a malicious attack, or a login attempt to by an authorized user in an unsecure environment. During a successful login of an account by an authorized user, restrictions may want to be placed when the login occurred over an unknown or insecure network. This can help prevent an authorized login from divulging private account information across an insecure network more prone to malicious attacks.

Upon determination of a confidence score, certain restrictions may be applied to the account before granting the user access to the account via the application. A confidence score can be segregated into ranges, such that various account restrictions can correspond to the various confidence score ranges. Restrictions can include preventing a user from accessing certain functions of the application or viewing private account information within the application. For example, a low confidence score indicating a potential malicious attack may cause the application to be fully restricted, such that no private account information is viewable and no application features can be utilized. As another example, a medium-to-high confidence score likely indicating an authorized user may provide some restrictions, such as preventing wire transfers of money above a certain value. In some examples, the scaling of confidence scores and corresponding restrictions placed on any account can be configurable by the entity controlling the application or by the user.

Restricting user account permissions based on a confidence score can increase account security while maintaining a level of user confidence that the account credentials have not been altered through a successful malicious attack. For example, a valid authorized user may successfully log into an account with a low confidence score, such as when using a new device in a foreign country after a number of unsuccessful login attempts. Instead of being locked out of the account completely, which may cause a user concern that the account has been hacked and the account credentials have been altered, the user may retain some access. In this example, the user in the very least may be able to view limited information or receive an acknowledgment from the application that the login was successful. This can inform the user that although the user logged into the account successfully and legitimately, certain risks may be involved with performing transactions over a specific network using a specific access device. For example, restricting an authorized user from fully accessing an account when anomalous user activity is observed may prevent private user information from being exposed to unsecured networks and public devices. Unsecured networks and devices may be subject to an increased risk of malicious attacks, such as through network spoofing or key logging.

These illustrative examples are given to introduce the reader to the general subject matter discussed here and are not intended to limit the scope of the disclosed concepts. The following sections describe various additional features and examples with reference to the drawings in which like numerals indicate like elements.

FIG. 1 is a schematic of a network environment 100 used to modify application permissions based on a user confidence score according to one example. The network environment 100 can include a Wide Area Network ("WAN") 106 through which user devices maybe communicate with various servers to implement application processes and gain access to account information.

A server 102 can be communicatively coupled to a database server 104 through the WAN 106. The server 102 can implement multiple applications that can be used by multiple users to access account information and perform application functions related to multiple accounts. The database server 104 can store any information necessary for the server 102 to implement any functions of an application in relation to account access and permissions. In some examples, the server 102 and database server 104 can be a single computing device that implements an application and stores user account information. The server 102 and the database server 104 can be operated and maintained by one or more entities implementing the applications that control access to user accounts.

The database server 104 can include a profile of all the known devices and behaviors of each user for each account provided by a certain application. For example, a single user may have two accounts corresponding to a lending application. The user may typically use a desktop to access information related to a first account, while more often using a mobile device to access information related to the second account. The database server 104 can record these user activity observations over time as a user profile for the server 102 to use in determining if any anomalous behavior occurs during further login attempts. For example, if the user attempts to access the first account using the mobile device, the confidence score of the successful login, as determined by the server 102, may be of a lower score than what would typically be given to the user.

The database server 104 can include a set of defined rules configurable by the user or entity providing the account services. For example, a user, after a successful login attempt and during an active account session via the application, may configure the account to restrict transfers of money over $1,000 when the confidence score is less than high, and to restrict all transfers of money completely when the confidence score is within a significantly lower threshold. As another example, an entity maintaining the server 102 and database server 104 can establish a broad rule across user accounts that involve additional user verification when a confidence score is below a threshold value.

The network environment 100 can include a user device 108 and an unauthorized user device 110 communicatively coupled to the server 102 and the database server 104 through the WAN 106. The network environment 100 can further include a user device 114 and an unauthorized user device 116 that is communicatively coupled to the server 102 and the database server 104 through a Local Area Network ("LAN") 112 communicatively connected to the WAN 106. Unauthorized user devices 110, 116 can refer to devices that are used by unauthorized users (e.g., hackers, automated hacking programs) to attempt to gain access to accounts corresponding to other people or entities. Examples of user devices 108, 114 and unauthorized user devices 110, 116 can include desktop computers, videogame consoles, mobile phones (e.g., cellular phones), PDAs, tablet computers, net books, laptop computers, hand-held specialized readers, wearing devices such as smart watches, etc.

An authorized account user can operate the user devices 108, 114 to attempt to gain access to account data and perform account functions through an application implemented by the database server 104. An unauthorized user can operate the unauthorized user devices 110, 116 to attempt to gain access to the authorized user's account data and perform account functions through an application implemented by the server 104. Based on user activity observations, including user behavior and device information that includes network information defined by the network environment 100, a confidence score can identify which login attempts may be security risks and modify a level of access associated with functions and data that can be executed subject to logging into an application.

Figure 2:
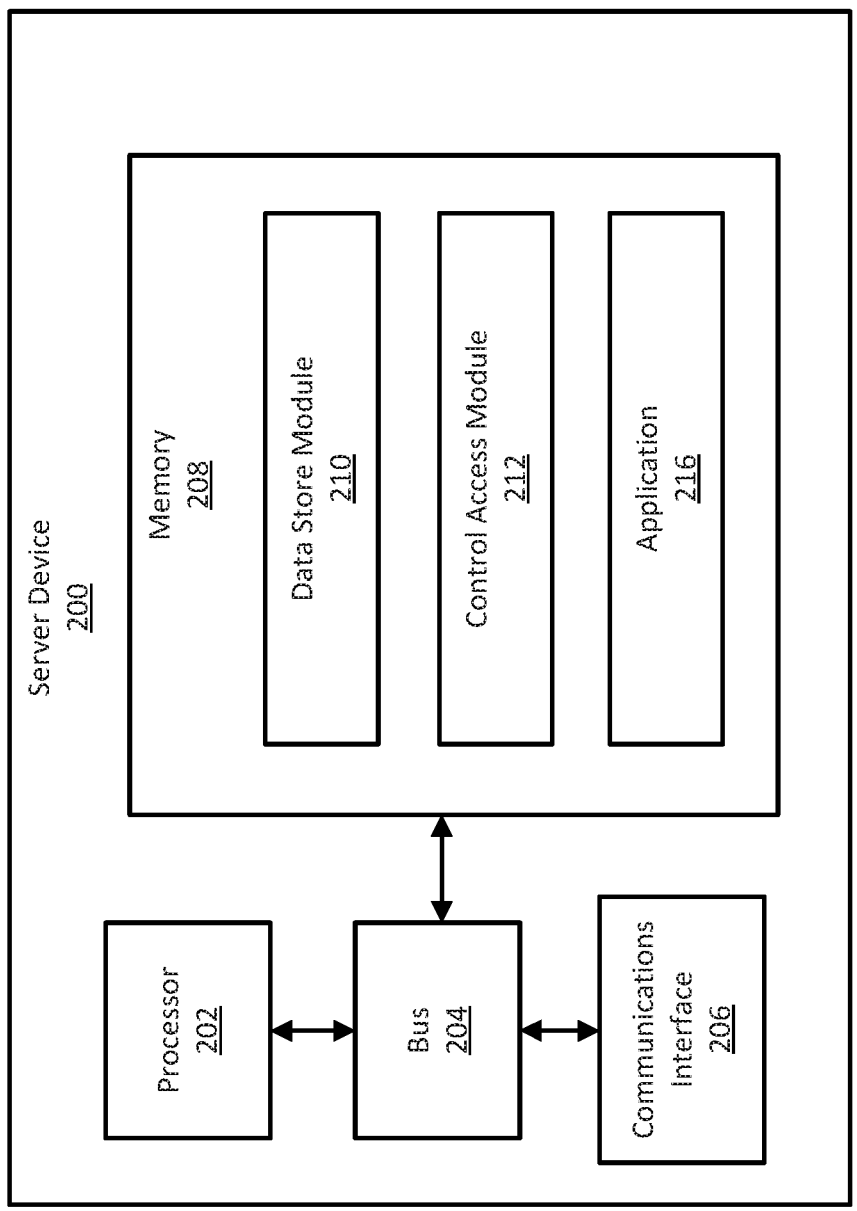
FIG. 2 is a block diagram of an example of a computing device usable for executing program code to modify application function accessibility based on a confidence score for a login according to one aspect of the present disclosure.

FIG. 2 is a block diagram of an example of a server device 200 usable for executing program code to modify application permissions based on a user confidence score according to one aspect of the present disclosure. For example, the server device 200 may be used as the server 102 from FIG. 1.

The server device 200 can be a network device and include a processor 202, a bus 204, a communications interface 206, and a memory 208. In some examples, the components shown in FIG. 2 can be integrated into a single structure. For example, the components can be within a single housing. In other examples, the components shown in FIG. 2 can be distributed (e.g., in separate housings) and in electrical communication with each other.

The processor 202 can execute one or more operations for implementing some examples. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 202 can read instructions. A computer-readable medium can include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The communications interface 206 can interface other network devices or network-capable devices to analyze and receive information related to accessing functions of an application. Information received from the communications interface 206 can be sent to the memory 208 via the bus 204. The memory 208 can store any information received from the communications interface 206.

The memory 208 can include program code for determining the relative risk for using an originating IP address and other information as identifying factors for purposes of authenticating a user. The memory 208 can include program code for a data store module 210 and a control access module 212. Also included in the memory 208 is an application 214 that can be used to access data and perform functions, such as transferring information or funds between accounts. The data store module 210 can store a user's account information (e.g., username and password, security information), the originating IP addresses of login attempts, browser settings of login attempts, etc. The control access module 212 can validate whether a user access attempt has been successfully authenticated after a user has entered the correct account login information. The control access module 212 can also determine the level of authentication that should be applied to a user access attempt, where increased levels of authentication may be required during higher risk scenarios as described by examples. The control access module 212 can also determine a threshold level of risk in which a higher level of authentication may be required (e.g., IP counter value reaches a certain threshold). The results from the control access module can be used to control the permissions and functions available to the user from the application 214.

Figure 3:
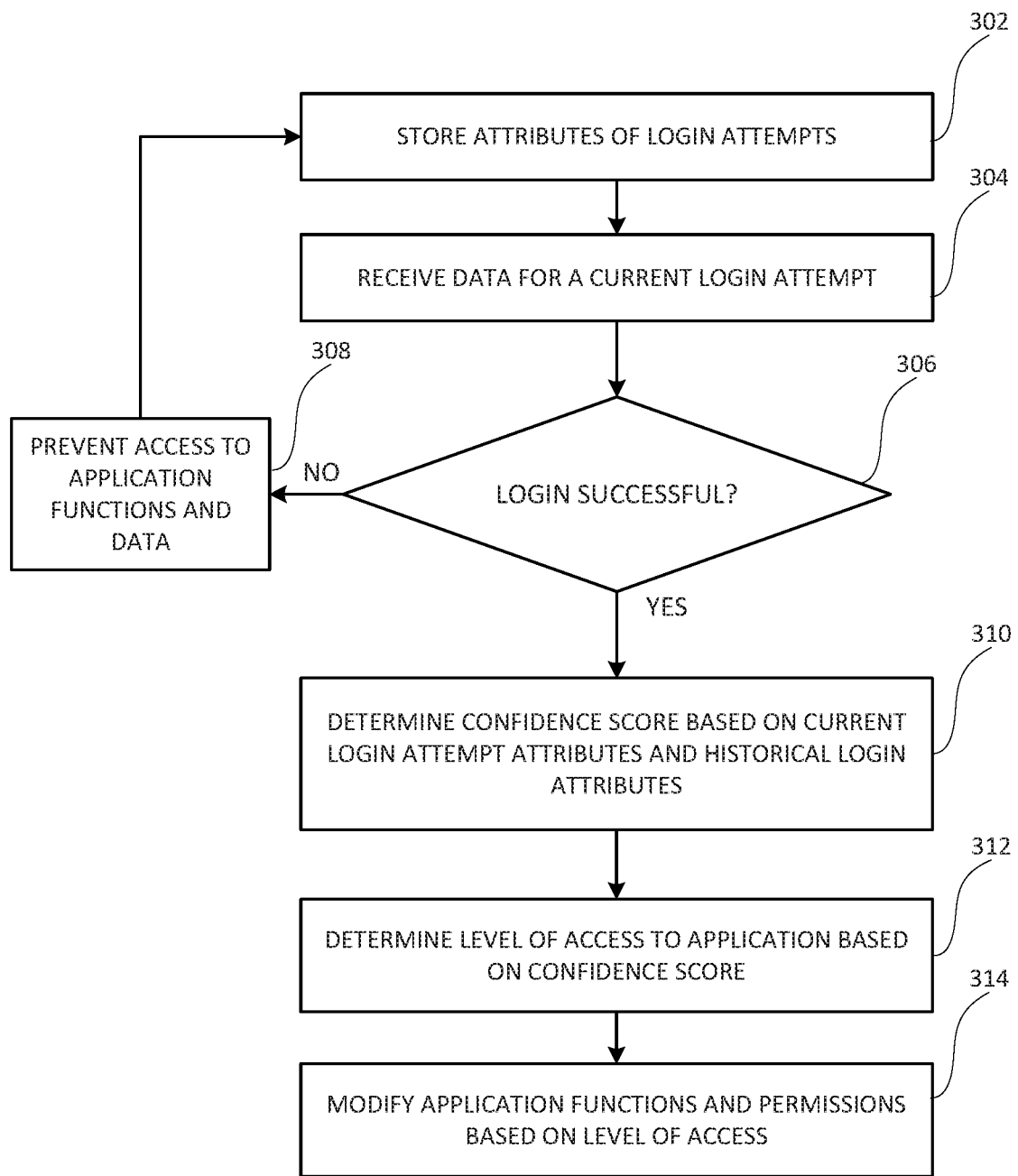
FIG. 3 is a flowchart of an example of a process for modifying application function accessibility based on a confidence score for a user login according to one aspect of the present disclosure.

FIG. 3 is a flow chart of an example of a process for modifying application permissions based on a user confidence score according to one aspect of the present disclosure. The process of FIG. 3 can be implemented by the server device 200 of FIG. 2, but other implementations are also possible.

In block 302, a server device stores attributes of login attempts for a user. Attributes may also be referred to as user activity observations. The attributes can include data associated with historical attempts, successful or unsuccessful, to login to a user account. Examples of attributes can include IP address of device used to attempt to login, location of device used to login, number of unsuccessful attempts to login, type of device used to login, etc. Device information (e.g., geolocation, MAC address, IP address) can be recorded and stored in a database. In some examples, this information can be detected and recorded by the server device operating the application. For example, a lending application can operate on servers in Greenland, and a user can initiate a connection (e.g., URL link, website, and application) and the server device can provide the application's user interface, services, functions, and other data to the user device via the server device.

In some examples, the user can load a pre-installed application on a mobile device. For example, the application may load on the user's mobile device, but a connection to the remote servers including the personalized account interface and information may not yet be established. In this example, the mobile device, via the application, can store the device information and login attempt behaviors. Upon connecting to the server, the mobile application can transfer the user device information and user login attempt behavior to the servers for use in processing a confidence score. In some examples, an application on a mobile device may use a secure connection to the servers storing the account information, such that the secure connection can allow the device information and user behavior to be observed directly by the servers, instead of temporarily storing such information on the user device mobile application prior to transferring it to the server.

In block 304, the server device receives data for a current login attempt. For the example, the server device can receive username, password, other credentials, and attributes of a current attempt by a user to login. The data can be received electronically over a telecommunications network, such as a wide area network.

In block 306, the server device compares the credentials (e.g., username and password) to stored information to determine whether credentials match. If there is no match, the server device prevents the user from accessing application functions and data in block 308. The attributes associated with the unsuccessful login attempt can also be stored in block 302.

If the server device determines that the credentials match stored data, then the server device determines a confidence score based on the attributes for the current login attempt as well as attributes for historical login attempts, in block 310. For example, the attributes for historical login attempts may indicate that the user most often logs in from Raleigh, N.C. If the current login attempt is also from Raleigh, N.C., then a higher confidence score can be assigned to the current login attempt. If the current login attempt is from a European country, for example, a lower confidence score can be assigned to the current login attempt. An enterprise can configure rules to determine a confidence score in accordance with the policy of the enterprise or other considerations specific to the particular enterprise. In some examples, confidence scoring is based on observations of historical user login attempts and identifying differences between the historical attributes and attributes for the current login attempt. In some examples, a machine-learning system can be used to formulate a user profile over time and use the profile to predict if certain login attempt behavior is normal or anomalous.

In block 312, the server device determines a level of access to an application based on the confidence score. The level of access can correspond to the type of data that is accessible, functions that can be performed, or both, subsequent to the user logging into the application. The rules regarding how the confidence score can be used to determine the level of access can be configurable by an enterprise to suit its needs. For example, in response to a low confidence score, only certain types of data may be accessible to the user and functions can be limited such that the user is unable to make changes using the application during the current login attempt. In contrast, in response to a high confidence score, all or substantially all data and functions may be accessible to the user. In some examples, a low confidence score may trigger further authentication and verification processes to confirm that the user is the appropriate user to access the application, even before any specific data is provided to the user.

The restrictions can include user account-specific rules that can be automatically generated over time. Factors can include how likely the consumer's regular behaviors would be inconvenienced. For example, one user may have typical activity including transferring funds around $100, and another user can have typical activity including transferring funds of up to $10,000 in any given transaction. Subject to the same type of known hacking methodologies, the confidence score may be the same for each user, such that each would be able or not be able to continue to transfer amounts they typically transfer. In some examples, both of the users with a certain confidence score indicating a slight chance for hacking may only be able to transfer a portion (e.g., 10%) or the typical funds, or may require a waiting and approval period to wire money. In some examples, based on the typical user observations, a same value for confidence scores of both users may allow the first user to continue typical activities while restricting the functionality of the account for the second user (e.g., cannot transfer typical amounts, or is limited to transfer only a portion). This may be based on the total assets in the accounts and the increased risk associated with transferring larger values as compared to transferring smaller values.

The confidence score can be associated with a customizable scale of restriction levels. For example, 0-10, 11-20, 21-30, etc. A confidence score of 0-10 can represent that that the successful login attempt is very likely the result of hacking methodologies. The confidence score can be a range or 0-100 or any other scaling or ranking method.

In block 314, the server device modifies the application functions and permissions based on the level of access. For example, the server device can change permissions in the application and block certain data and functions from being provided to the user. And the permissions may be based on both the confidence score and a user profile. For example, user 1 and user 2 may both have confidence score of 75, indicating a high confidence for both. With a 75, user 1 may need to provide additional authentication if transferring $1000, since this is atypical behavior, whereas user 2 may not be required to go through additional authentication since transferring $1000 is within the typical observed user behavior for that user. The restrictions and accessible data can be modified upon each login.

Figure 4:
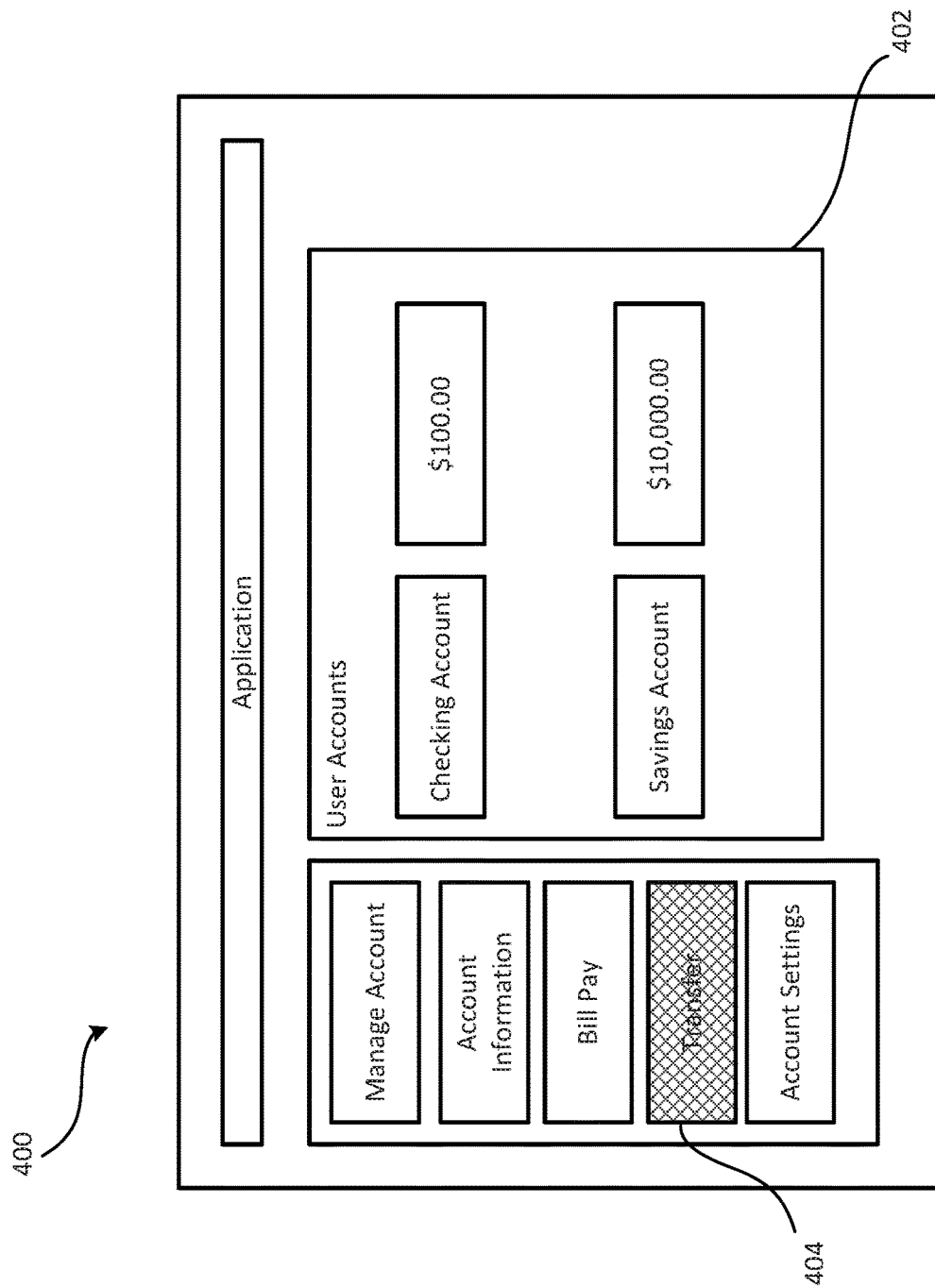
FIG. 4 is an example of a graphical user interface for performing selected functions in a network-accessed communication application based on a confidence score for a user login according to one aspect of the present disclosure.

FIG. 4 is a user interface 400 with modified permissions based on a user confidence score according to one aspect of the present disclosure. The user interface 400 can be provided to the user subsequent to the user logging in. Although user account data 402 is viewable by the user, some options and functions are inaccessible to the user. In FIG. 4, the transfer function 404 is shown as grayed out or otherwise inaccessible such that the user is unable to transfer funds.

Modifying permissions can include denial of access to functions and data while avoiding blocking the user completely from the account. Limited access can be based on the confidence score. Examples of different stages of access from most restrictive to least restrictive can include: only allowing viewing of account data, allowing viewing of account data and limited functions, allowing viewing of account and the ability to perform most or all functions but with restrictions, such as a cap on the amount of money or the amount of data transferred to another account, allowing full account functions and data access.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:
a processor; and
a non-transitory computer-readable memory comprising instructions that are executable by the processor for causing the processor to:
receive a first set of user activity observations associated with an authorized user of a user account;
generate, based on the first set of user activity observations, a user profile for the authorized user associated with the user account;
validate a current login attempt as successful by comparing credentials received in relation to the current login attempt with stored account credentials; and
subsequent to validating the current login attempt as successful:
determine a confidence score by comparing the user profile to a second set of user activity observations associated with the current login attempt, the confidence score being determined from among a plurality of confidence scores associated with a plurality of access levels capable of being applied to the user account, each access level of the plurality of access levels conferring a respective level of access to the user account that is different than the other access levels of the plurality of access levels; and
prior to granting access to the user account, determine a level of access from among the plurality of access levels to grant to the user account based on the confidence score.

2. The system of claim 1, wherein the memory further comprises instructions that are executable by the processor for causing the processor to determine the confidence score by:
determining a login attempt type for the current login attempt based on the second set of user activity observations; and
determining the confidence score from among the plurality of confidence scores based on the login attempt type.

3. The system of claim 1, wherein the plurality of confidence scores include a first confidence score associated with a first login attempt type involving a successful login attempt by the authorized user, a second confidence score associated with a second login attempt type involving an unsuccessful login attempt by the authorized user, a third confidence score associated with a third login attempt type involving a successful login attempt by the authorized user in an unsecure environment, and a fourth confidence score associated with a fourth login attempt type involving a hacking attempt by an unauthorized user.

4. The system of claim 1, and wherein the memory further comprises instructions that are executable by the processor for causing the processor to generate the user profile by:
determining, based on the first set of user activity observations, user behavior associated with the authorized user of the user account;

determining device characteristics associated with a device used by the authorized user to access the user account; and storing the user behavior and the device characteristics in a database as the user profile.

5. The system of claim 4, wherein the device characteristics comprise an IP address for the device, a MAC address for the device, a device identification for the device, browser settings for the device, a location for the device, or a network used by the device for a login attempt.

6. The system of claim 4, wherein the user behavior comprises a number of times, a speed, or a pattern in which credentials are received from the authorized user during a login attempt.

7. The system of claim 4, wherein the memory further comprises instructions that are executable by the processor for causing the processor to, prior to granting access to the user account:

determine that the confidence score is below a predetermined threshold; and based on determining that the confidence score is below the predetermined threshold, transmit, to the device, a request for additional authentication information from the user.

8. A method comprising:

receiving, by a processor, a first set of user activity observations associated with an authorized user of a user account;

generating, by the processor and based on the first set of user activity observations, a user profile for the authorized user associated with the user account;

validating, by the processor, a current login attempt as successful by comparing credentials received in relation to the current login attempt with stored account credentials; and subsequent to validating the current login attempt as successful:

determining, by the processor, a confidence score by comparing the user profile to a second set of user activity observations associated with the current login attempt, the confidence score being determined from among a plurality of confidence scores associated with a plurality of access levels capable of being applied to the user account, each access level of the plurality of access levels conferring a respective level of access to the user account that is different than the other access levels of the plurality of access levels; and prior to granting access to the user account, determining, by the processor, a level of access from among the plurality of access levels to grant to the user account based on the confidence score.

9. The method of claim 8, wherein determining the confidence score further comprises:

determining a login attempt type for the current login attempt based on the second set of user activity observations; and determining the confidence score from among the plurality of confidence scores based on the login attempt type.

10. The method of claim 8, wherein the plurality of confidence scores include a first confidence score associated with a first login attempt type involving a a successful login attempt by the authorized user, a second confidence score associated with a second login attempt type involving an unsuccessful login attempt by the authorized user, a third confidence score associated with a third login attempt type involving a successful login attempt by the authorized user in an unsecure environment, and a fourth confidence score associated with a fourth login attempt type involving hacking attempt by an unauthorized user.

11. The method of claim 8, wherein generating the user profile further comprises:

determining, based on the first set of user activity observations, user behavior associated with the authorized user of the user account;

determining device characteristics associated with a device used by the authorized user to access the user account; and storing the user behavior and the device characteristics in a database as the user profile.

12. The method of claim 11, wherein the device characteristics includes an IP address for the device, a MAC address for the device, a device identification for the device, browser settings for the device, a location for the device, or a network used by the device for a login attempt.

13. The method of claim 11, wherein the user behavior includes a number of times, a speed, or a pattern in which credentials are received from the authorized user during a login attempt.

14. The method of claim 11, further comprising, prior to granting access to the user account:

determining that the confidence score is below a predetermined threshold; and based on determining that the confidence score is below the predetermined threshold, transmitting, to the device, a request for additional authentication information from the user.

15. A non-transitory computer-readable medium having program code that is executable by a processor for causing the processor to perform operations, the operations comprising:

receiving a first set of user activity observations associated with an authorized user of a user account;

generating, based on the first set of user activity observations, a user profile for the authorized user associated with the user account;

validating a current login attempt as successful by comparing credentials received in relation to the current login attempt with stored account credentials; and subsequent to validating the current login attempt as successful:

determining a confidence score by comparing the user profile to a second set of user activity observations associated with the current login attempt, the confidence score being determined from among a plurality of confidence scores associated with a plurality of access levels capable of being applied to the user account, each access level of the plurality of access levels conferring a respective level of access to the user account that is different than the other access levels of the plurality of access levels; and prior to granting access to the user account, determining a level of access from among the plurality of access levels to grant to the user account based on the confidence score.

16. The non-transitory computer-readable medium of claim 15, further comprising program code that is executable by the processor for causing the processor to determine the confidence score by:

determining a login attempt type for the current login attempt based on the second set of user activity observations; and determining the confidence score from among the plurality of confidence scores based on the login attempt type.

17. The non-transitory computer-readable medium of claim 15, wherein the plurality of confidence scores include a first confidence score associated with a first login attempt type involving a successful login attempt by the authorized user, a second confidence score associated with a second login attempt type involving an unsuccessful login attempt by the authorized user, a third confidence score associated with a third login attempt type involving a successful login attempt by the authorized user in an unsecure environment, and a fourth confidence score associated with a fourth login attempt type involving hacking attempt by an unauthorized user.

18. The non-transitory computer-readable medium of claim 17, further comprising program code that is executable by the processor for causing the processor to generate the user profile further by:

determining, based on the first set of user activity observations, user behavior associated with the authorized user of the user account;

determining device characteristics associated with a device used by the authorized user to access the user account; and storing the user behavior and the device characteristics in a database as the user profile.

19. The non-transitory computer-readable medium of claim 18, wherein the device characteristics comprises an IP address for the device, a MAC address for the device, a device identification for the device, browser settings for the device, a location for the device, or a network used by the device for a login attempt.

20. The non-transitory computer-readable medium of claim 18, wherein the user behavior comprises a number of times, a speed, or a pattern in which credentials are received from the authorized user during a login attempt.

\* \* \* \* \*